United States Patent
Gurtatowski et al.

(10) Patent No.: US 7,159,946 B2
(45) Date of Patent: Jan. 9, 2007

(54) HEADREST GUIDE BUTTON ASSEMBLY

(75) Inventors: Craig W. Gurtatowski, Crown Point, IN (US); Steven R. Andrews, Orland Park, IL (US); Simon Lorenc, Chicago, IL (US)

(73) Assignee: Illinois Tool Worlk Inc, Glenview, IL (US)

( * ) Notice: Subject to any disclaimer, the term of this patent is extended or adjusted under 35 U.S.C. 154(b) by 29 days.

(21) Appl. No.: 11/110,559

(22) Filed: Apr. 20, 2005

(65) Prior Publication Data

US 2005/0280305 A1    Dec. 22, 2005

Related U.S. Application Data

(60) Provisional application No. 60/580,557, filed on Jun. 17, 2004.

(51) Int. Cl.
*A47C 7/36* (2006.01)
(52) U.S. Cl. .................................. 297/410; 297/391
(58) Field of Classification Search ................ 297/410, 297/411.36, 391
See application file for complete search history.

(56) References Cited

U.S. PATENT DOCUMENTS

| | | | | |
|---|---|---|---|---|
| 5,156,440 A | * | 10/1992 | Vidwans | 297/410 |
| 5,529,379 A | * | 6/1996 | Stocker | 297/410 |
| 5,823,623 A | * | 10/1998 | Beck | 297/410 |
| 5,860,703 A | * | 1/1999 | Courtois et al. | 297/410 |
| 6,655,742 B1 | * | 12/2003 | Ozaki | 297/410 |
| 6,742,846 B1 | * | 6/2004 | Isaacson | 297/410 |
| 2005/0077772 A1 | * | 4/2005 | Yamada | 297/410 |
| 2005/0212343 A1 | * | 9/2005 | Katahira | 297/410 |

FOREIGN PATENT DOCUMENTS

WO    WO 03/059683 A1    7/2003

OTHER PUBLICATIONS

WO/ 0305983. Behrmann, Wolfgang. Retaining Device for a Adjustable Height Headrest. Full Text English Language Translation provided by US Patent and Trademark Office, Jul. 2006.*

* cited by examiner

*Primary Examiner*—Peter M. Cuomo
*Assistant Examiner*—Sarah B. McPartlin
(74) *Attorney, Agent, or Firm*—Mark W. Croll; Paul F. Donovan (57) ABSTRACT

A headrest is supported by a first rod and a second rod, the first rod being equipped with a series of positioning notches on a first side and a retaining notch on a second side. In operation, the two rods are installed into two channels in the seat, one of the channels being equipped with a headrest guide assembly. The headrest guide assembly includes a button that allows the user to selectively engage the series of positioning notches on the first side of the first rod so that the headrest can be positioned as desired. However, the headrest guide assembly will automatically engage the retaining notch on the second side and thus prevent the headrest from being removed from the seat. To remove the headrest, a tool can be inserted into a notch in the button and to insertion of the tool prevents the headrest guide assembly from engaging the retaining notch on the second side and thus the headrest can be removed.

20 Claims, 13 Drawing Sheets

HEADREST GUIDE BUTTON ASSEMBLY

CROSS REFERENCE TO RELATED APPLICATION

This Non-Provisional Application claims benefit to U.S. Provisional Application Ser. No. 60/580,557 filed Jun. 17, 2004.

FIELD OF THE INVENTION

The present invention relates generally to a headrest guide and more particularly to a headrest guide button assembly for use in an automobile.

BACKGROUND OF THE INVENTION

The use of a headrest guide assembly is known in the art. As is known, automobiles are designed to accommodate individuals having a range of heights. Because of the potential variations in height of the occupants, and to prevent serious injury such as whiplash, vehicle manufactures provide adjustable headrests mounted on one or more supports, such as one or more cylindrical rods. To provide an adjustable headrest, one of the supports can include a series of notches on a first side, each notch defining a possible position for the headrest. A guide assembly is mounted to the seat and can engage the notches so that the headrest can be held in a desired position. Once a button on the guide assembly is pressed, the support can be moved up or down between notches so that the headrest can be repositioned as desired. Some such designs also allow the headrest to be removed from the seat in a similar manner.

Proposed Federal Motor Vehicle Safety Standard 202a, however, would require that the headrest be designed so that the headrest cannot be removed from the seat solely by hand. To prevent the rod and the headrest from being removed from the seat, a notch can be provided on a second side of the rod that will engage the guide assembly and prevent removal of the headrest. However, this can make removal of the headrest from the seat difficult. To meet the proposed standard while still allowing for removal of the headrest in order to provide for separate replacement of seats and headrests, current designs often use two guides. A button on a first guide assembly allows the first guide assembly to disengage from the notches on the first side of the rod so that the headrest can be repositioned. To remove the headrest, a second guide assembly can be actuated so that the second guide assembly does not engage the notch on the second side of the rod and thus, the headrest can be removed from the seat. Unfortunately, such a design requires two guide assemblies, which increases the cost and complexity of the overall seat design. The increase in cost and complexity is especially troublesome given the infrequent need to remove the headrest. The present invention is directed at solving these and other known problems by providing a single guide assembly that will allow for positioning of the headrest by activating a button while still allowing removal of the headrest pursuant to the proposed Federal standard.

SUMMARY OF THE INVENTION

The present invention is directed to an improved headrest guide assembly. In an embodiment, a headrest is supported by a first and second rod, the first rod being equipped with a series of positioning notches on a first side and a retaining notch on a second side. In operation, the two rods are installed into two channels in the seat, one of the channels being equipped with a headrest guide assembly. The headrest guide assembly is configured to selectively engage the series of positioning notches on the first side of the first rod so that the headrest can be positioned as desired. However, the guide assembly will automatically engage the retaining notch on the second side of the first rod and thus prevent the headrest from being removed from the seat. When the headrest needs to be removed, a tool can be inserted into an opening in the headrest guide assembly that will cause the guide assembly to not engage the retaining notch on the second side of the first rod and thus the headrest can be removed.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Figure 1:
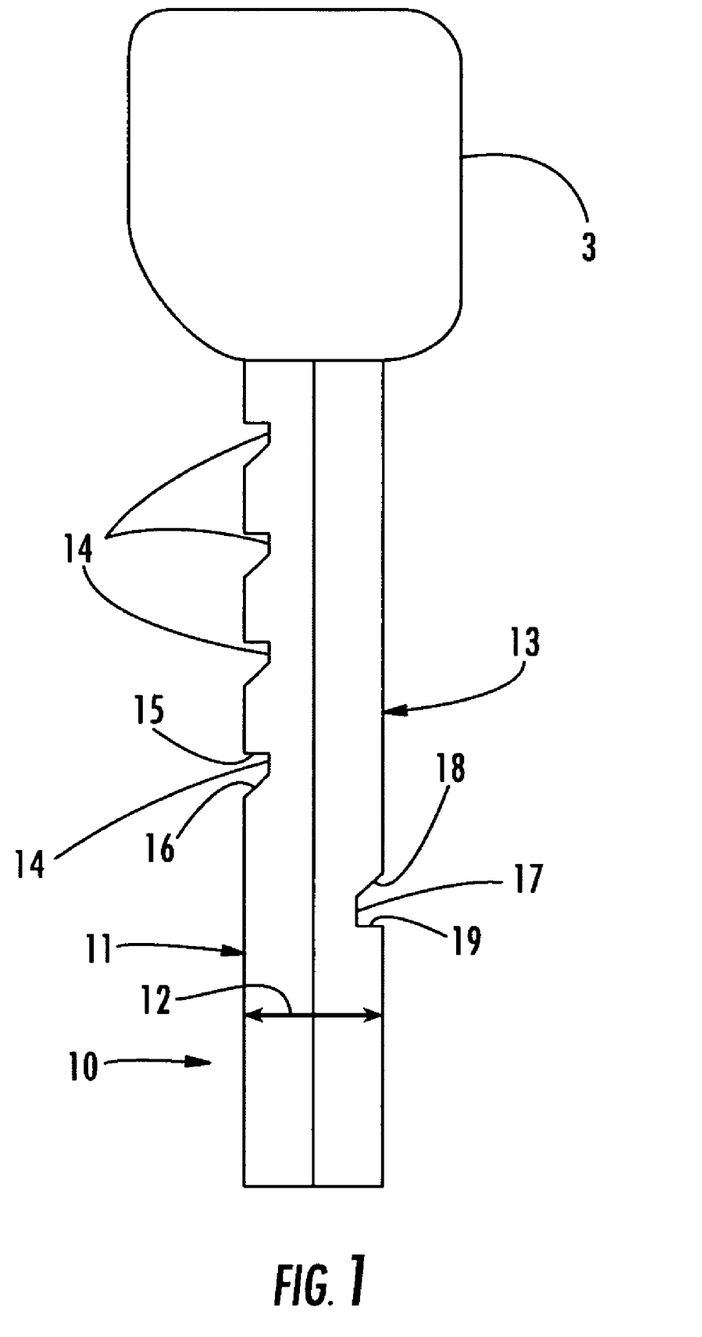
FIG. 1 is a front view of a rod configured to support a headrest.

Referring to FIG. 1, a side view of a rod 10 which can be used to support a headrest 3 is illustrated. In an exemplary embodiment, the rod is cylindrical in shape with a diameter 12 and includes a series of positioning notches 14 on a first side 11 and a retaining notch 17 on a second side 13. As can be appreciated, to prevent undesirable rotation, typically the headrest 3 will be supported by two rods. However, as is known in the art, notches can be provided on just one of the rods to control to the position of the headrest 3. In an alternative exemplary embodiment, not shown, a single support with a non-circular profile could be used to support the headrest 3.

As depicted, the notch 14 includes a shoulder 15 and a shoulder 16. The shoulder 15 preferably is at a 90 degree angle so that once the headrest 3 is positioned, the application of a sudden force to the headrest will not cause the headrest to move in a downward direction. The shoulder 16 can be at some angle less than 90 degrees so that the headrest 3 can be raised as desired to the appropriate position by the simple application of force until reaching the retaining notch 17. Similarly, the retaining notch 17 includes a shoulder 18 and a shoulder 19. The shoulder 19 preferably is at a 90 degree angle so that removal of the rod 10 is prevented. The shoulder 18 preferably is at an angle less than 90 degrees so that, by the simple application of force, the rod 10 can be pressed back down until reaching the positioning notch 14.

Figure 2:
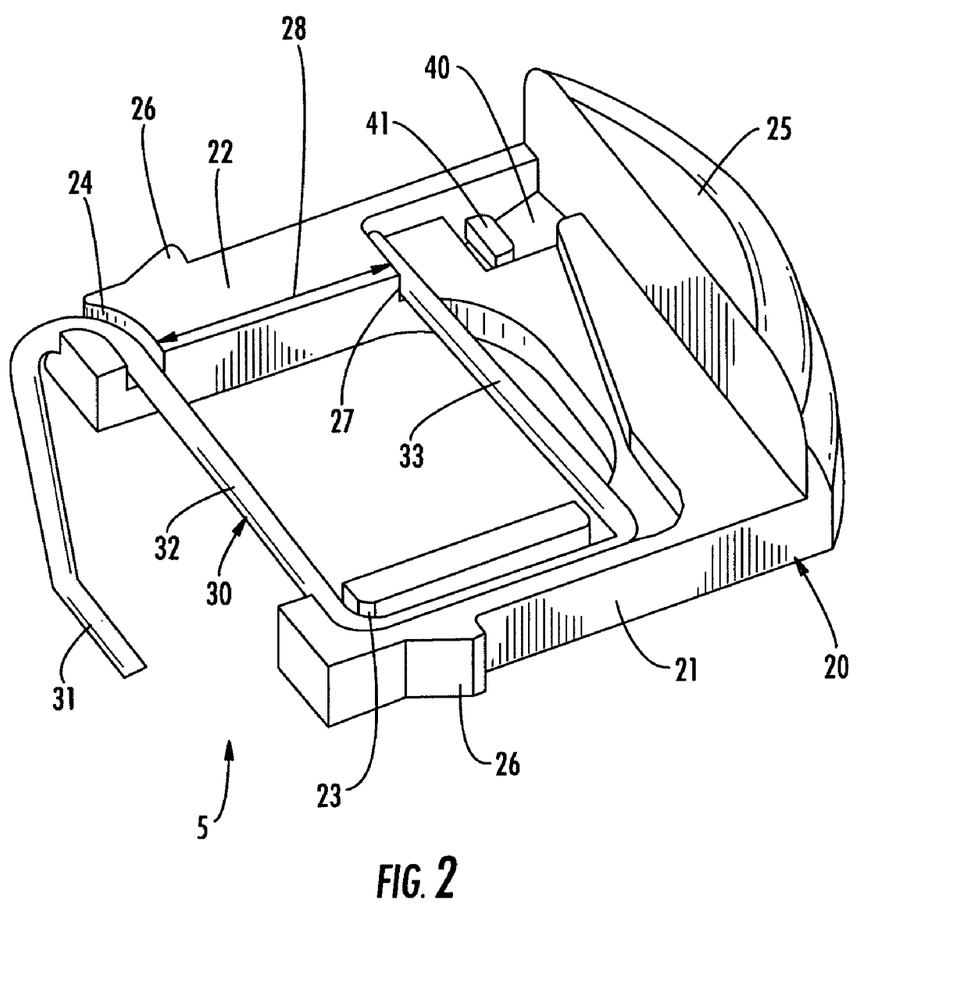
FIG. 2 is an isometric partial view of an exemplary headrest guide assembly.

Turning to FIG. 2, an isometric partial view of a guide assembly 5 is depicted. A button 20 includes a first arm 21 and a second arm 22. The first arm 21 includes a first channel 23 and the second arm 22 includes a second channel 24. The button 20 further includes a rounded surface 25 and a shoulder 27. As depicted, the distance 28 between the shoulder 27 and the second channel 24 is less than the diameter 12 of the rod 10. The channels 23, 24 of the arms 21, 22 are configured to receive a spring 30. The spring 30 includes a first portion 31, a second portion 32 and a third portion 33. In the depicted embodiment, the spring 30 is a single piece.

As configured, the second portion 32 of the spring 30 is secured at both ends to the arms 21 and 22 while the first portion 31 and the third portion 33 can flex in a spring-like manner. Thus, as configured, the second portion 32 does not substantially flex during operation but rather is configured to remain in contact with the rod 10 in a manner that will be discussed in greater detail below. Accordingly, the second portion 32 acts like a bar connecting the first and second arms 21, 22. It should be noted that by supporting the second portion 32 with both of the arms 21, 22, the second portion 32 is able to withstand significant forces, a desirable feature when designing a headrest guide assembly.

A portion of the retaining arm 40 is also visible, the retaining arm 40 including a finger 41. The retaining arm 40 is designed to hold the third portion 33 of spring 30 in a flexed position. However, as is apparent from FIG. 2, when the third portion 33 is in the relaxed position, as illustrated, retaining arm 40 cannot affect the position of third portion 33. As depicted, retaining arm 40 is connected to button 20 but in a flexible manner, thus the connection is similar to a living hinge arrangement. Numerous other methods of mounting the retaining arm 40 to the button 20 exist, however, and other methods of attachment could allow for engaging the third portion 33 in the relaxed position. For example, the retaining arm 40 could be rotatably attached to the button 20 or the retaining arm 40 could be slidably attached to the button 20 so as to allow the retaining arm 40 to slide along a path when a tool was inserted. The advantage of using a flexible attachment method, however, is that there is no need for a separate part or any type of fastener to attach the retaining arm to the button, thus the flexible attachment method can reduce the cost and complexity of the guide assembly 5.

Figure 3:
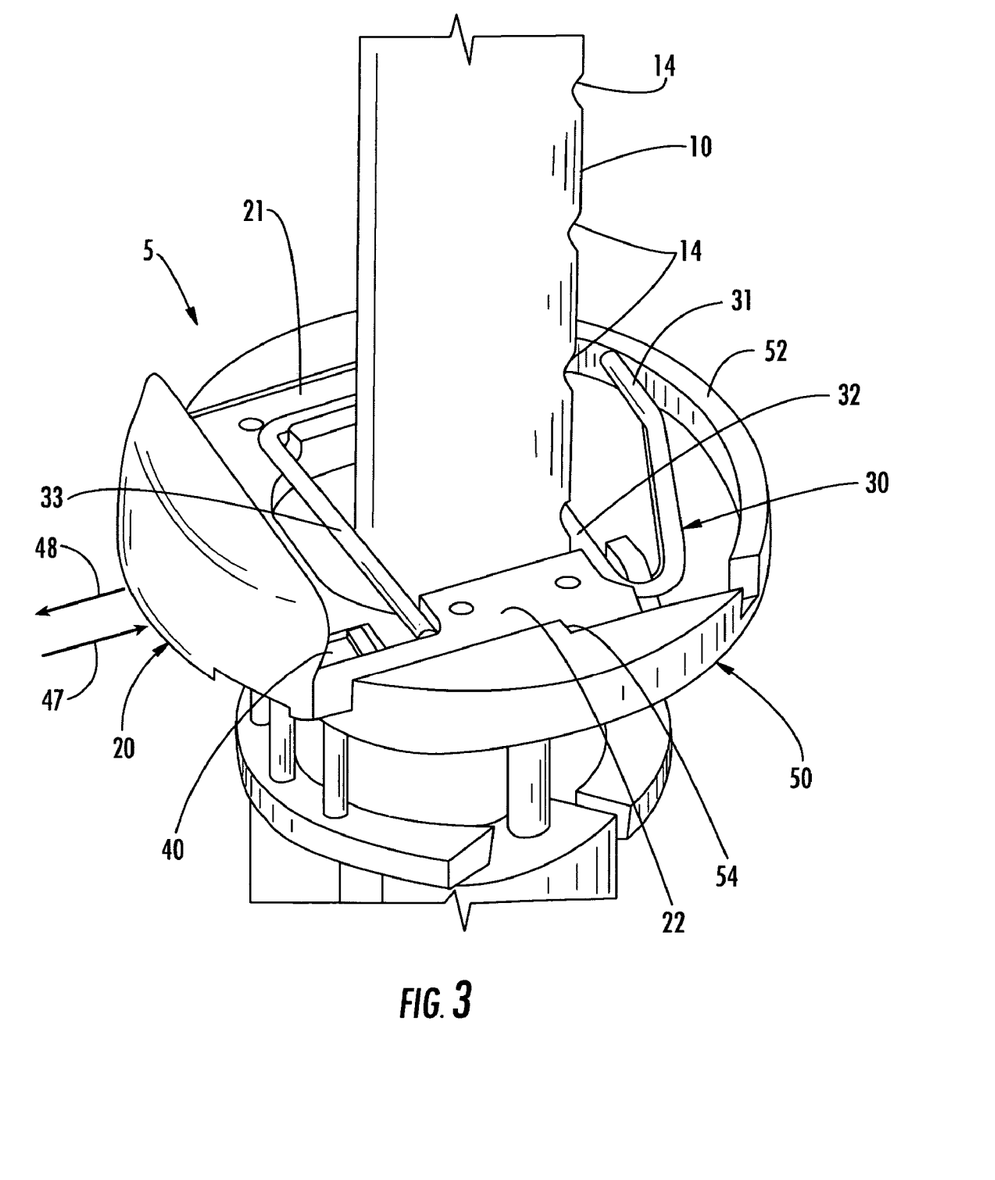
FIG. 3 is an elevated partial view of the guide assembly of FIG. 2 engaging a rod.

Looking at FIG. 3, a partial isometric view of a guide assembly 5 including a base 50 is shown. The button 20 is slidably mounted to the base 50 and the base 50 is connected to a support edge 52, the support edge 52 being pressed against by the first portion 31 of the spring 30. When the rod 10 is inserted into the guide assembly 5, the second portion 32, which is fixed to arms 21, 22, is displaced by the rod 10 so that the button 20 is directed into the guide assembly 5 in a first direction 47. Resisting the movement of the button 20 into the guide assembly 5 is the first portion 31 of the spring 30. As the button 20 is moved into the guide assembly 5 along the first direction, the first portion 31 is flexed and the insertion force is transformed into potential energy due to the flexing of the first portion 31. Thus the first portion 31 acts as a first biasing element. When the positioning notch 14 of the rod 10 is encountered, the potential energy stored in the spring 30 directs the button 20 back out of the guide assembly 5 in a second direction 48 a distance equal to the depth of the positioning notch 14. Thus, the second portion 32 remains in substantially constant contact with the first surface 11 of the rod 10 (FIG. 1).

It should be also noted that the third portion 33 is also flexed prior to the guide assembly 5 engaging the positioning notch 14 because the relaxed position of the third portion 33 is configured so as to be located a distance from the middle portion 32 that is less than the diameter 12 of the rod 10 (FIG. 1). Thus, the third portion 33 also contains potential energy that would tend to direct the button 20 along the second direction 48. Therefore, the third portion 33 acts as a second biasing element.

Referring to FIGS. 1–3, a projection 26 can be configured to interface with the lip 54. As depicted, a lip 54 limits the distance the button 20 can travel along the second direction 48 so that even if the rod 10 was not present, the button 20 would not slide out of the guide assembly 5.

Once the second portion 32 engages the position notch 14, the shape of the shoulder 15 prevents the rod 10 from being further inserted in a downward direction while the shoulder 16 allows the rod 10 to be pulled in an upward direction. To further insert the rod 10, a force can be applied to the button 20 to overcome the spring force created by the flexing of the first portion 31. To accomplish this, the arms 21, 22 and the supported second portion 32 are moved in the first direction 47 until the second portion 32 clears the shoulder 15 of the positioning notch 14. In this manner, the rod 10 can be further inserted into the guide assembly 5 and the headrest 3 can be repositioned as desired.

Figure 4A:
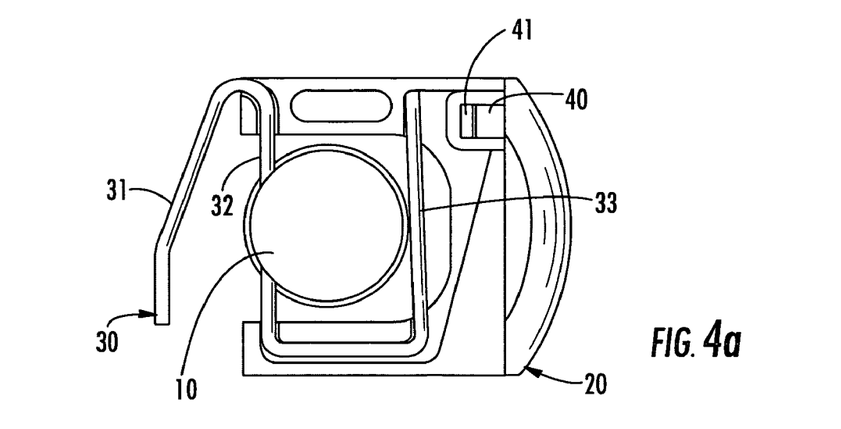
FIG. 4a is a partial plan view of an exemplary guide assembly engaging a rod at a positioning notch.
Figure 4B:
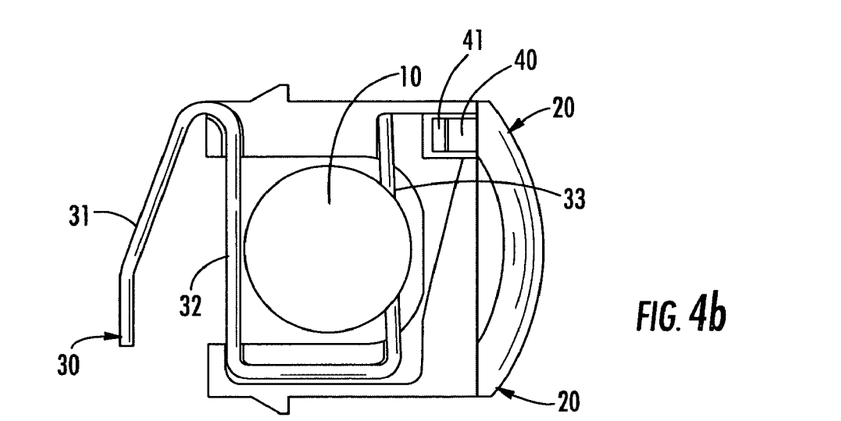
FIG. 4b is a partial plan view of the guide assembly of FIG. 4a engaging a rod at a retaining notch.
Figure 4C:
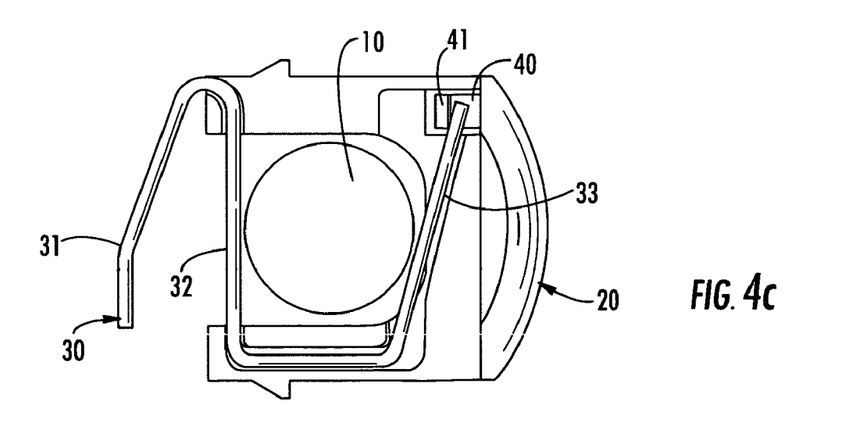
FIG. 4c is a partial plan view of the guide assembly of FIG. 4a engaging a rod between the positioning notch and the retaining notch.

Turning next to FIGS. 4a–4c, plan views of an embodiment of the button 20 and the spring 30 engaging the rod 10 are illustrated. FIGS. 4a–4c thus illustrate partial views of how an embodiment of the guide assembly would engage the rod 10 at places of interest. In FIG. 4a, the button 20 is engaging one of the positioning notches 14 on the rod 10. In FIG. 4b, the button 20 is engaging the retaining notch 17 on the rod 10. In FIG. 4c, the button 20 is engaging the rod 10 at a position between the positioning notch 14 and the retaining notch 17, for example between the positions represented by the illustrations of FIGS. 4a and 4b. As can be appreciated, in FIG. 4a and in FIG. 4b, the third portion 33 is in a relaxed position and is not located adjacent the retaining arm 40. In FIG. 4c, however, the third portion 33 is in a flexed position such that the third portion 33 is adjacent the retaining arm 40 so that the retaining arm 40, in combination with the finger 41, can act on the third portion 33 and hold the third portion 33 in the flexed position.

Figure 5:
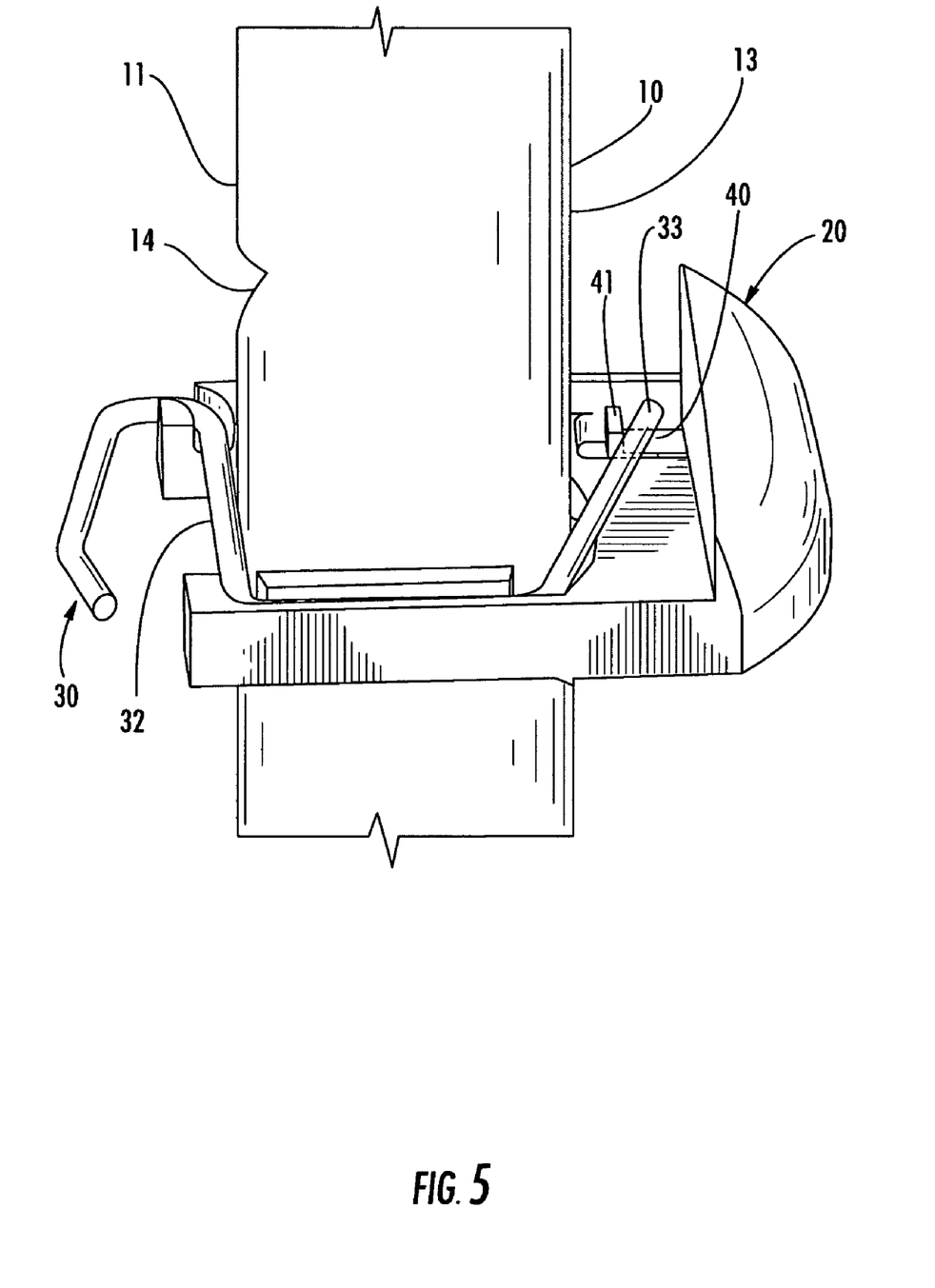
FIG. 5 is a cutaway elevated view of an exemplary guide assembly engaging a rod between a positioning notch and a retaining notch.

FIG. 5 depicts an elevated view of an exemplary embodiment of the button 20 located between the retaining notch 14 and the positioning notch 17. As depicted, the second portion 32 of the spring 30 is in contact with the first surface 11 of the rod 10 and the third portion 33 of the spring 30 is in contact with the second surface 13 of the rod 10. Due to the diameter 12 (FIG. 1) of the rod 10, the third portion 33 of the spring 30 is moved to the flexed positioned.

Figure 6:
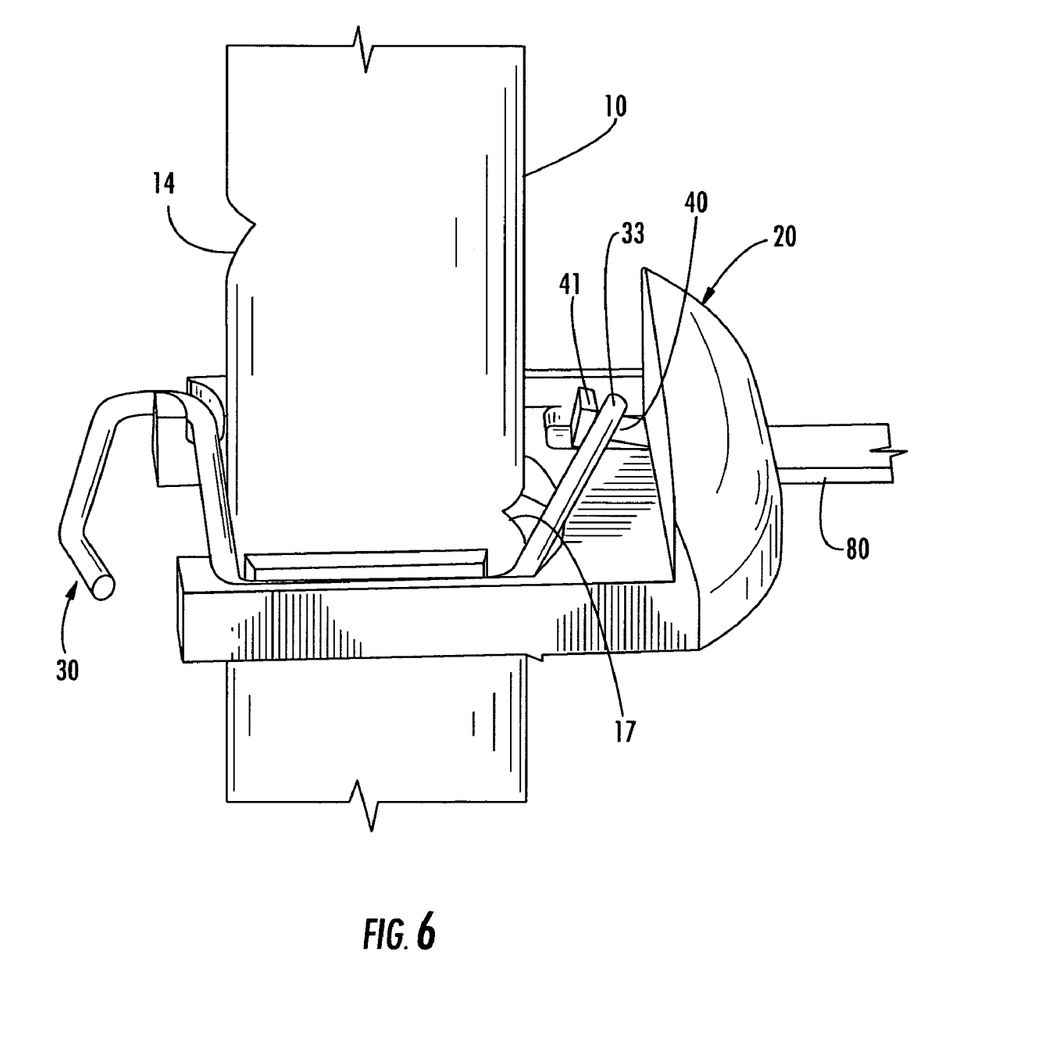
FIG. 6 is a cutaway elevated view of the exemplary guide assembly as depicted in FIG. 5 with a tool inserted.

Turning next to FIG. 6, the embodiment of the button 20 depicted in FIG. 5 is illustrated with a tool 80 inserted. The insertion of the tool 80 causes the retaining arm 40 to translate such that finger 41 holds the third portion 33 of the spring 30 in the flexed position. Thus, the third portion 33 of the spring 30 will not engage the retaining notch 17 of the rod 10 and the rod 10 can be pulled up so that the headrest 3 mounted to the rod 10, as depicted in FIG. 1, can be separated from the seat.

Figure 7:
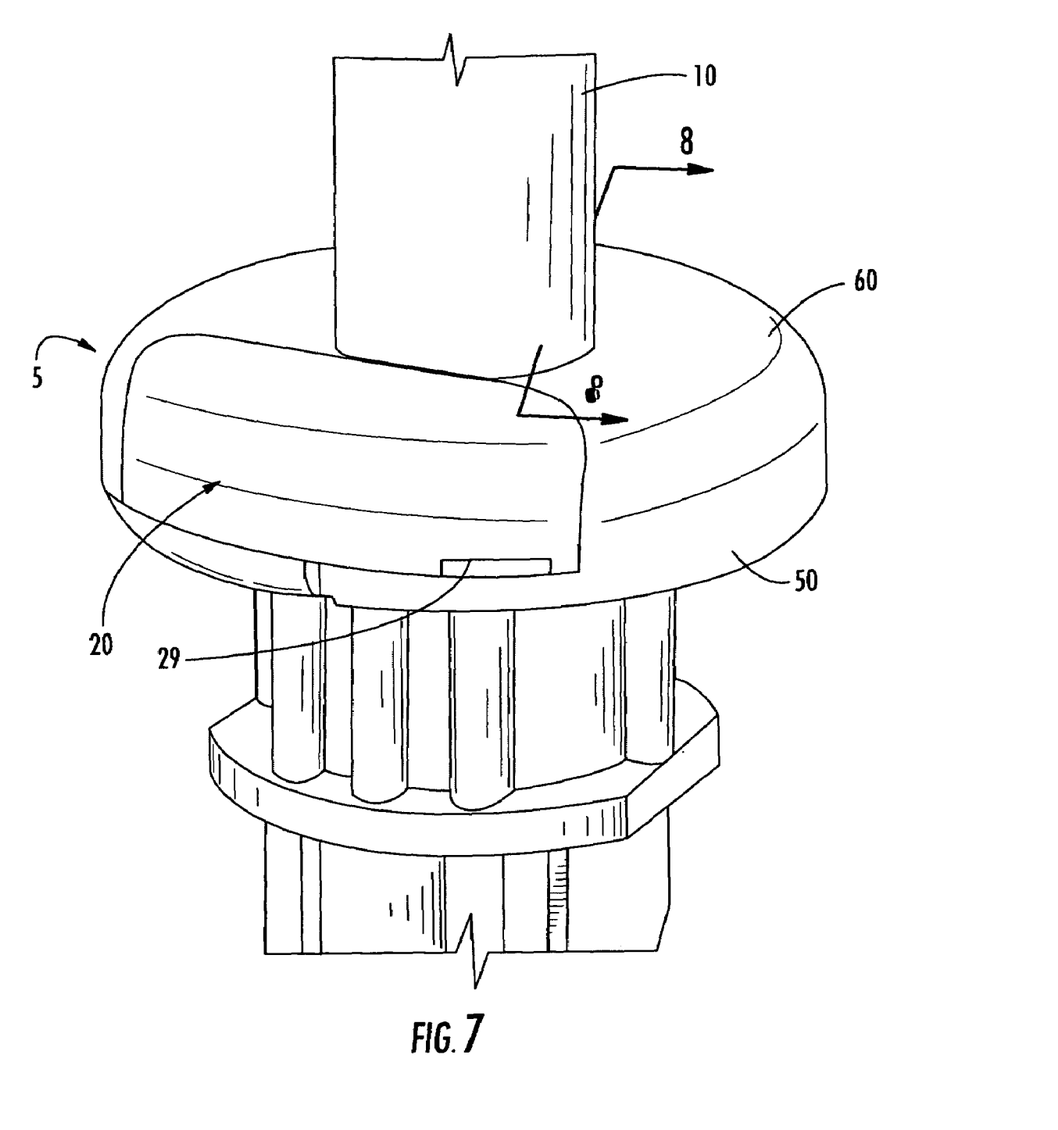
FIG. 7 is an elevated front view of an exemplary headrest guide assembly.

Looking at FIG. 7, an elevated view of the rod 10 inserted into the guide assembly 5 is provided. Guide assembly 5 includes the button 20, the base 50 and the cover 60. A notch 29 is provided in the button 20 so that a tool, such as the tool 80 of FIG. 6, can be inserted into the guide assembly 5, the insertion of the tool causing the retaining arm 40 to translate so that the retaining arm 40 can hold the third portion 33 of the spring 30 in the flexed position.

Referring back to FIG. 2, it can be observed that the arms 21, 22 each include the projection 26. As stated, the projection 26 can be used to prevent the button 20, once assembled, from being removed from the guide assembly 5 by interfacing with the lip 54 depicted in FIG. 3. Thus, if the base 50 and cover 60 are a single piece, the arms 21, 22 can be configured to flex so as to allow the button 20 to be inserted into the guide assembly 5. Once inserted, the projections 26 would hold the button 20 in place. In an alternative embodiment where the base and cover are two separate pieces, either the base or the cover can include the lip 54 such as provided for in FIG. 3, the lip 54 interfacing with the projection 26 to prevent the button from being removed from the guide assembly 5 when the rod 10 is not inserted into the guide assembly 5. While not required, this interlocking feature has the benefit of minimizing the chance of lost components during shipping or while servicing a headrest.

Figure 8A:
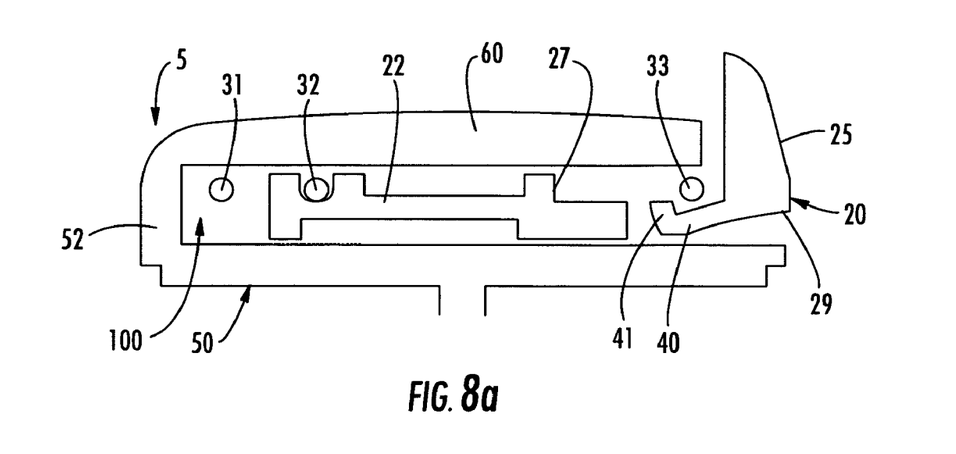
FIG. 8a is a partial cross-sectional view of an exemplary guide assembly engaging a rod between a positioning notch and a retaining notch.
Figure 8B:
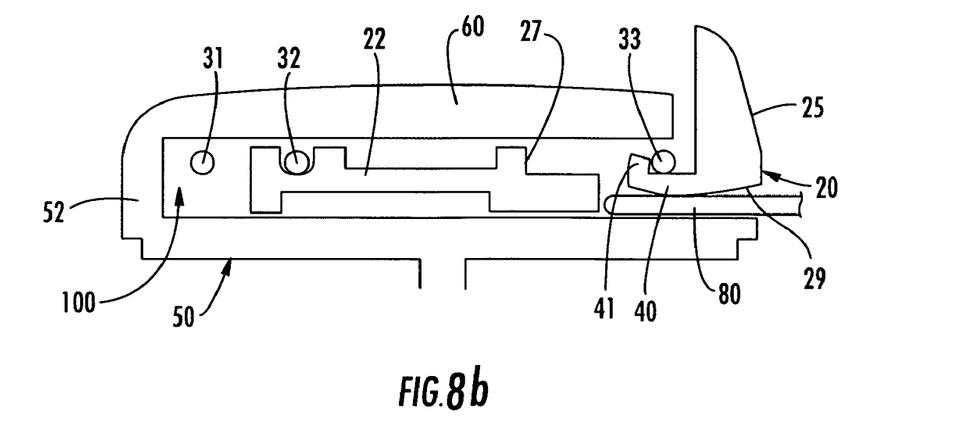
FIG. 8b is a partial cross-sectional view as depicted in FIG. 8a with a tool inserted.

Turning now to FIGS. 8a & 8b, cross-sectional views of an exemplary embodiment of the guide assembly are illustrated, the cross section taken along the line 8—8 in FIG. 7. As depicted, the button 20 is inserted into a pocket 100 formed by the base 50, the support edge 52 and the cover 60. In an embodiment, a single part can be used to form the pocket 100 and to encapsulate the button 20. In an alternative embodiment, two or more pieces, such as a separate base 50 and a separate cover 60, can be used to form the pocket 100 of the guide assembly 5. If two or more pieces are used, they may be attached together in a known fashion. Preferably, the support edge 52 is connected to, or part of, either the base 50 or the cover 60 if the pocket 100 is not formed by a single piece.

Thus, FIG. 8a depicts a cross-section along the lines 8—8 in FIG. 7 where the button 20 is fully inserted into the pocket 100. While only a part of the first portion 31 is visible in FIG. 8a, the other end of first portion 31 is pressed against the support edge 52 as depicted in FIG. 3. In addition, the third portion 33 is in a flexed position similar to the position of third portion 33 depicted in FIG. 5. Thus, FIG. 8a is representative of the guide assembly 5 engaging the rod 10 at a point between the positioning notch 14 and the retaining notch 17 depicted in FIG. 1.

Turning to FIG. 8b, the tool 80 is shown inserted into the notch 29. The insertion of the tool 80 causes the retaining arm 40 to translate upward so that the finger 41, in combination with retaining arm 40, can restrain the third portion 33 and hold the third portion 33 in the flexed position. When so positioned, the headrest support can be removed from the guide assembly 5 because the guide assembly 5 will not automatically engage the retaining notch 17. However, if the tool 80 is not inserted, the shoulder 18 of the notch 17 (FIG. 1) will allow the third portion 33 to return to a relaxed position adjacent the shoulder 27, thus automatically preventing the rod 10 from being removed from the guide assembly 5.

The button 20 and the base 50 can be formed out of a suitable material such as nylon but must be strong enough to withstand the forces exerted on the guide assembly 5 during a collision. As is known in the art, depending on the desired physical properties and the type of manufacturing process, the material, if plastic, can include fillers or additives that modify the properties of the base materials used.

Similarly, the spring 30 must be of sufficient strength to withstand the potential impact caused by a collision. To meet this requirement, various materials such as steel alloys can be used to fashion the spring 30. Preferably, however, the spring is a single piece and is "S" shaped as depicted in FIG. 2. The use of a single piece spring 30 reduces the complexity of installing the spring 30 to the button 20 and also provides a certain amount of compactness generally desirable in automotive components.

It should be noted that while it is desirable for the guide assembly to be relatively compact, the rounded surface 25 of the button 20 is preferably of sufficient size to allow the users to readily press on the rounded surface 25 to actuate the button 20 without encountering sharp edges or the like.

Figure 9:
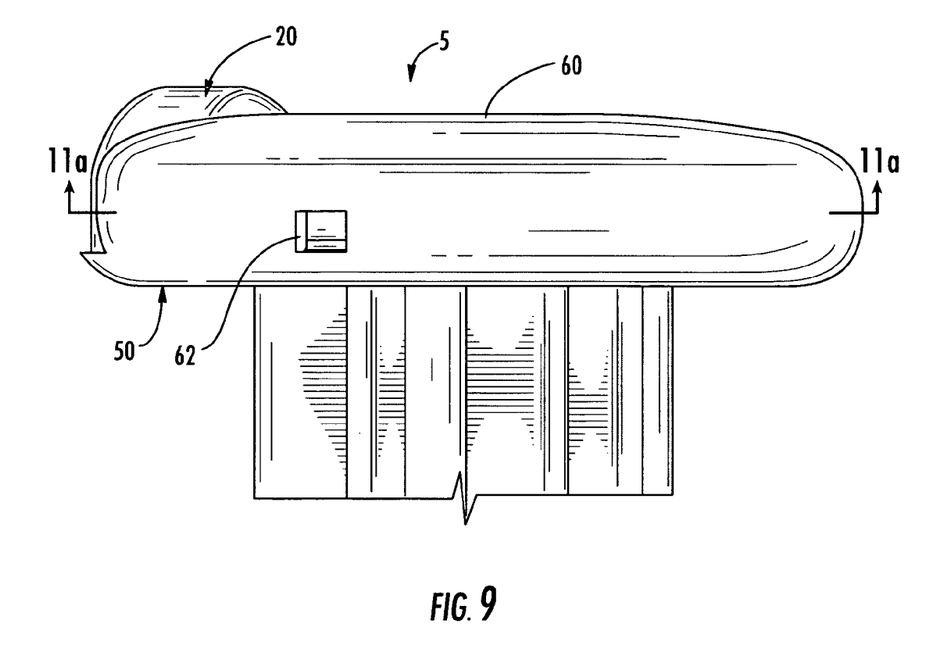
FIG. 9 is a side view of an alternative exemplary embodiment of a guide assembly.

Turning now to FIG. 9, an alternative exemplary embodiment of a guide assembly 5 is depicted. The base 50 is mounted to the cover 60 and includes a notch 62. As previously discussed, the base 50 and the cover 60 can be combined into one piece or can be formed of two or more pieces, depending on manufacturing preferences.

Figure 10:
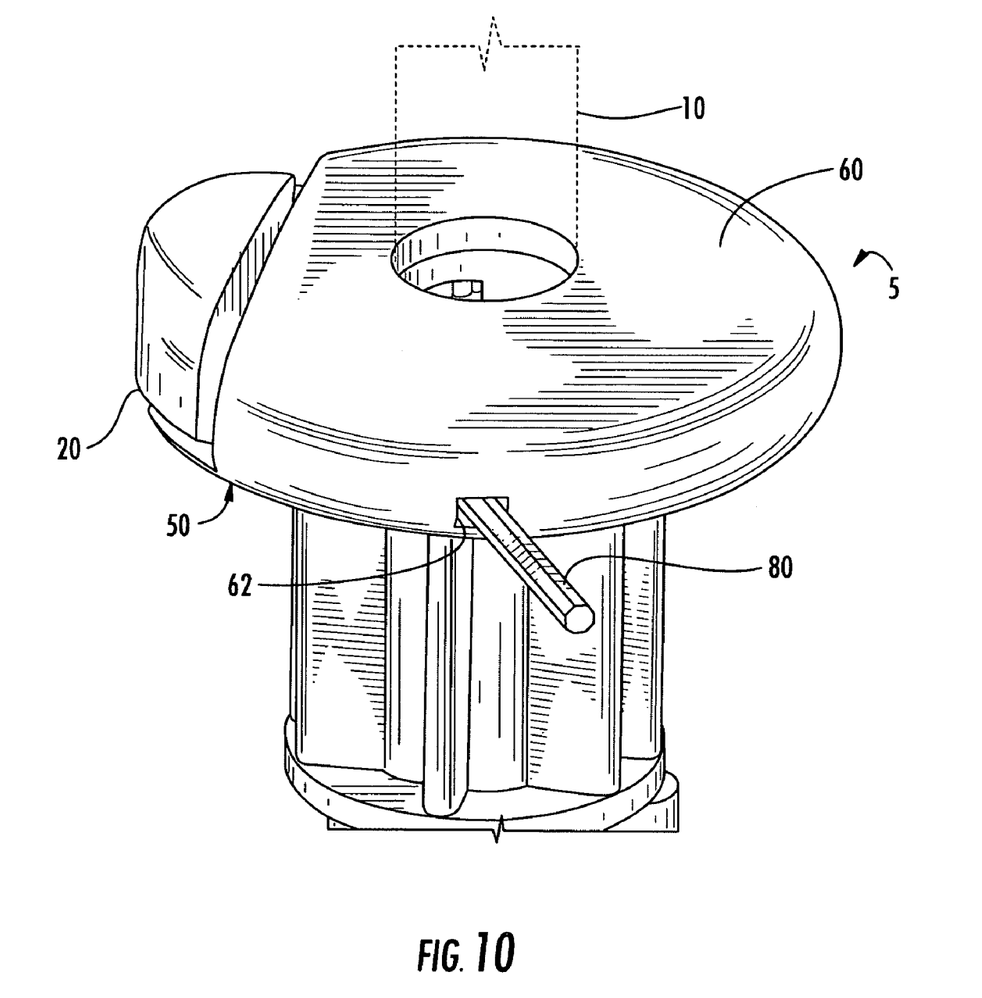
FIG. 10 is an elevated view of the embodiment depicted in FIG. 9 with a rod and a tool inserted into the guide assembly.

Looking at FIG. 10, an isometric view of the embodiment depicted in FIG. 9 is illustrated. As depicted, the button 20 is mounted to the base 50 and cover 60 as previously discussed. Also, the rod 10 is inserted into the guide assembly 5 and the tool 80 is shown inserted into the notch 62.

Figure 11A:
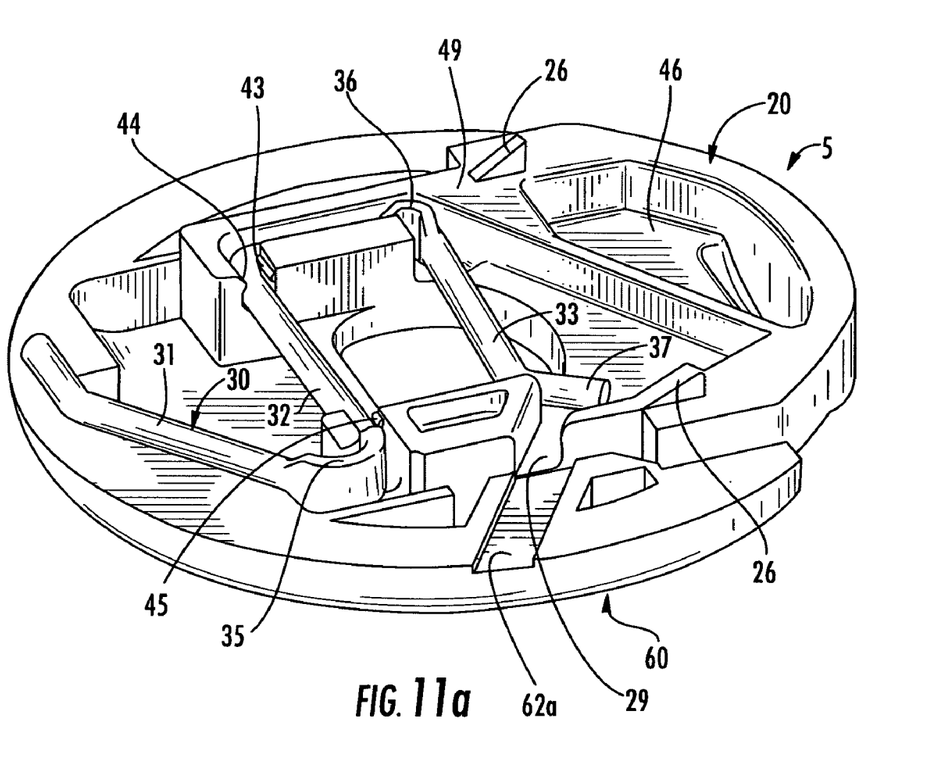
FIG. 11a is an isometric view of a cross section taken along the line 11—11 in FIG. 9.

Turning now to FIG. 11a, an isometric view of a cross section taken along the line 11—11 in FIG. 10 is illustrated. The spring 30, which is depicted as a single spring, includes the first portion 31, the second portion 32 and the third portion 33. To aid in withstanding repeated use of the guide assembly, the first portion 31 is mounted to a first flexing member 35. Similarly, the third portion 33 is mounted to a second flexing member 36. As can be appreciated, the geometry of the first and the second flexing members 35, 36 aids in allowing the spring force resisting the flexing of the either the first portion 31 or the second portion 33 to be somewhat independent of the stiffness of the first and third portion 31, 33. Thus, in an embodiment, the flexing member 35 can be configured to allow the button to be pressed with relative ease while providing a relatively stiff and inflexible first and second portion 31, 32. It should be noted that the first flexing member 35 and the second flexing member 36 can have different configurations to provide a different resistance to translating the first and third portions 31, 33, respectively.

As depicted, the cover 60 includes a notch 62a. In an embodiment where the base 50 and the cover 60 are separate pieces, the notch 62 as depicted in FIG. 9 could be located entirely in either the base or the cover, however, as depicted in FIG. 11a a portion of the notch 62 is provided in the cover 60 as the notch 62a.

The button 20 also includes the notch 29. Thus, the combination of the notch 62 (also known as a cover notch and of which a portion is shown as notch 62a) and the notch 29 provides a passageway from outside the guide assembly to the third portion 33. As depicted, the third portion 33 includes an angled portion 37. Thus, when the notch 29 and the notch 62a are aligned, a passageway is provided that allows an object to be inserted into the guide assembly 5 so as to interact with the angled portion 37.

As depicted, the button 20 also includes two projections 26. As previously discussed, these projections 26 are useful in helping to prevent the button 20 from being removed from the guide assembly 5 once installed and can engage a corresponding lip 1 not shown.

As an additional assembly aid and to help maintain the location of the spring 30, a rib 43 and an opposing rib 44 are provided. The ribs 43, 44 are configured to allow the spring 30 to be snapped into place and help hold the spring 30 in the proper location. In this regard, it should be noted that the flexing members 35, 36 are configured to be substantially flush with a sliding surface 49 of the button 20. As the surface 49 is configured to slide on a support surface of the base 50 (not shown), the flexing members 35, 36 also help ensure the position of the spring 30 is maintained. Additional ribs, such as rib 45, alone or in combination with other ribs (not shown) can also be provided to aid in helping to maintain the position of the spring 30.

The button 20 may include a recess 46. The recess 46, while not required, is useful to minimize materials used to manufacture the button 20. In addition, the recess 46 helps keep the material thickness of the button 20 more uniform to improve manufacturing of the button 20 if the button 20 is formed via a molding process.

Figure 11B:
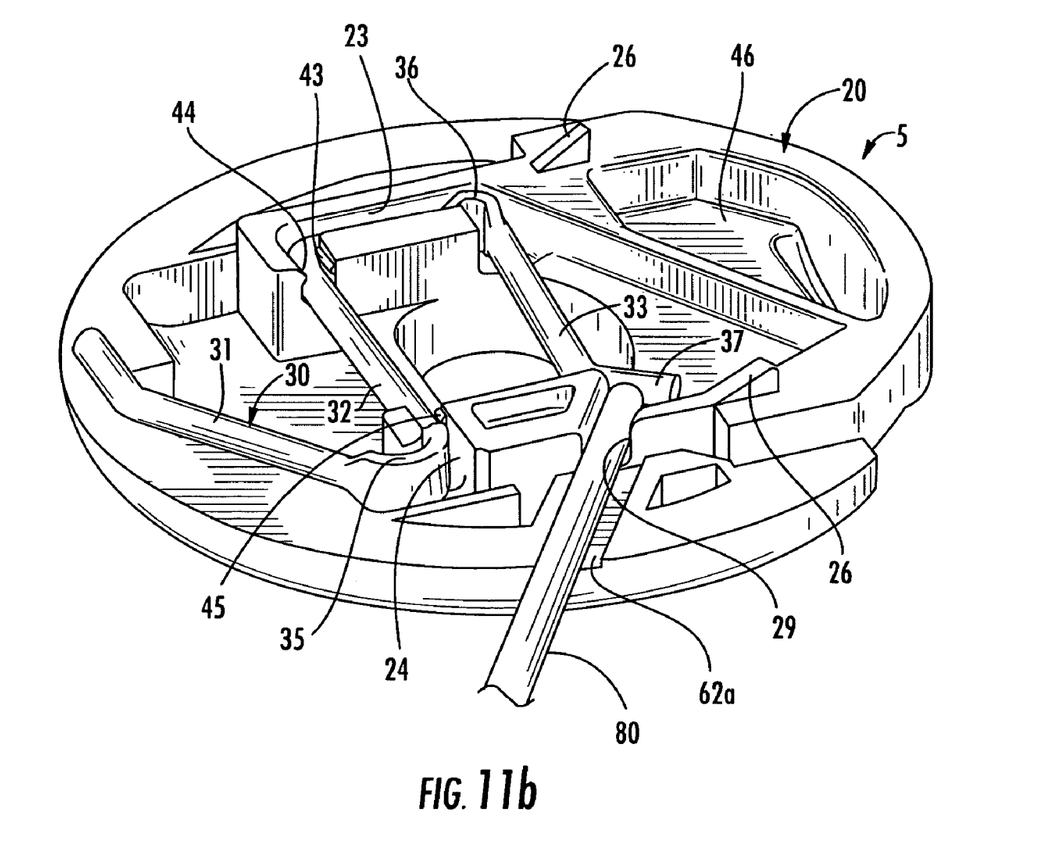
FIG. 11b is an isometric view of the cross section along the line 11—11 but showing a tool inserted into the guide.

Turning to FIG. 11b, the embodiment depicted in FIG. 11a is illustrated with the tool 80 inserted in the passageway created by the alignment of the notch 62a and the notch 29.

Figure 12:
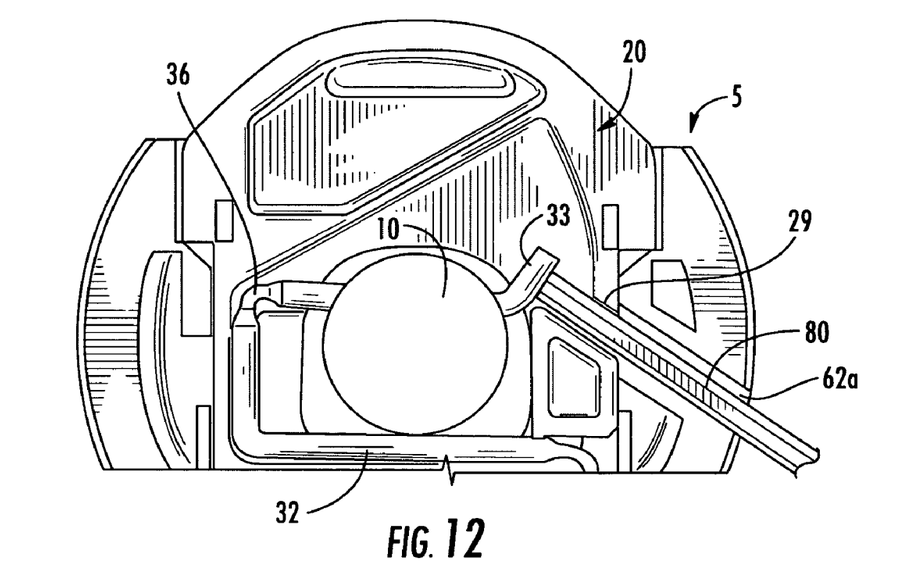
FIG. 12 is a plan view of a cross section similar to the cross section depicted in FIG. 11b showing a biasing element in a first position.

Turning to FIG. 12, a plan view of the cross section depicted in FIG. 11b is illustrated. As depicted, the third portion 33 has engaged the retaining notch 17 of the rod 10 depicted in FIG. 1. While not required, the retaining notch 17 can be located below the lower positioning notch 14 as shown in FIG. 1.

Figure 13:
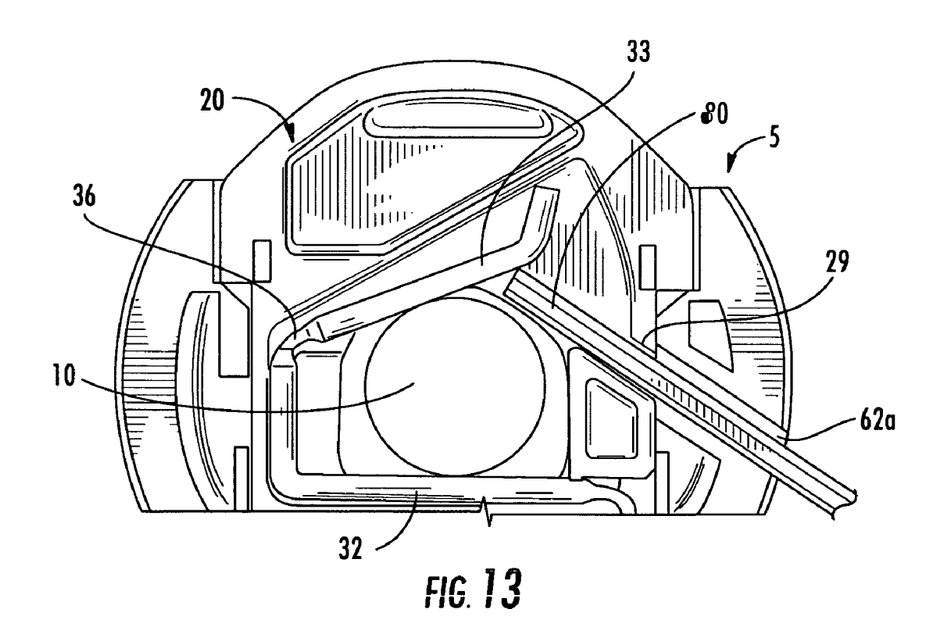
FIG. 13 is the view depicted in FIG. 12 showing the biasing element in a second position.

In the embodiment depicted in FIGS. 1–8b, once the third portion 33 of the spring 30 engages the retaining notch 17 of the rod 10, inserting the tool 80 into the notch 29 will not cause the third portion 33 to disengage the retaining notch 17. As can be appreciated, the embodiment of the guide assembly 5 depicted in FIG. 12 has engaged retaining notch 17 of FIG. 1. If the tool 80 is inserted through the notch 62a and notch 29 it can press on the third portion 33 and move it to the flexed position as depicted in FIG. 13. Thus, an advantage of the embodiment depicted in FIG. 12 is that the rod 10 supporting the headrest 3 can be raised until it has engaged the retaining notch 17 (as shown in FIG. 1), at which point the rod 10 cannot be raised further without additional action. The tool 80 can then be inserted to move the third portion 33 to the flexed position so that the third portion 33 does not engage the retaining notch 17 and the rod 10 and the associated headrest 3 may be removed. Thus, the embodiment depicted in FIGS. 12–13 simplifies the positioning of the rod 10 in relation to the guide assembly when preparing for removal of the rod 10 from the guide assembly 5.

Turning to FIG. 13, the third portion 33 is in a second or flexed position. As previously noted, when attempting to slide the rod 10 out of the guide assembly 5, the third portion 33 of spring 30 will automatically engage the retaining notch 17 (shown in FIG. 1). Once the third portion 33 is in the second or flexed position, however, the guide assembly 5 will not engage the retaining notch 17 depicted in FIG. 1 and the rod 10 can be removed from the guide assembly 5.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A guide assembly for engaging a headrest support, the headrest support having a positioning notch on a first side and a retaining notch on a second side, to guide assembly comprising:
    a base;
    a cover;
    a button configured to slidably mount to the base, the button having a notch;
    a spring mounted to the button, the spring having a first portion, a second portion and a third flexible portion, the third portion being translatable between a relaxed position and a flexed position, wherein the third portion is configured to be maintained in a flexed position when a tool is inserted through the notch in the button and is caused to directly engage the third flexible portion of the spring.

2. The guide assembly as set forth in claim 1, wherein the button includes a first arm and a second arm; wherein to second portion of the spring is mounted to the first and second arms so as to substantially limit movement of the second portion of the spring relative to the first and second arms.

3. The guide assembly set forth in claim 2, wherein the guide assembly includes a retaining arm configured to hold the third portion in the flexed position, wherein the retaining arm is flexibly connected to the button such that, in operation, the insertion of the tool into the notch will cause the retaining arm to translate.

4. The guide assembly as set forth in claim 3, the retaining arm further comprising a finger, the finger configured to restrain the third portion of the spring, whereby the retaining arm restrains the third portion when the tool is inserted into the notch while the third portion is in a flexed position.

5. The guide assembly as set forth in claim 2, the guide assembly further comprising a support edge positioned adjacent the cover and the base, the support edge configured to constrain the first portion of the spring.

6. The guide assembly set forth in claim 5, wherein support edge is connected to the base.

7. The guide assembly set forth in claim 6, wherein the first arm includes a first channel and the second arm includes a second channel, wherein the spring is configured to mount to the first and second arm via the first and second channel.

8. The guide assembly set forth in claim 7, wherein the distance between the second portion and third portion of the spring, when the third portion of the spring is in a relaxed position, is less than the corresponding width of the headrest support.

9. The guide assembly as set forth in claim 8, further comprising a lip mounted to the base and at least one projection extending from one of the first and second arms, the projection configured to interface with the lip.

10. A guide assembly for engaging a rod configured to support a headrest, the rod including a plurality of positioning notches and a retaining notch, the guide assembly comprising;
  a base, the base supporting a support edge;
  a cover mounted to the support edge;
  a button configured to slidably mount between the base and the cover, the button including a first arm and a second arm;
  a bar mounted to the first and second arms, the bar configured to engage the plurality of positioning notches;
  a first biasing element mounted to the button, the first biasing element configured to press against the support edge of the base so as to direct the button in a first direction;
  a second biasing element mounted to the button, the second biasing element configured to engage the notch; and
  a notch provided on the button, the notch of the button configured to accept a tool, wherein the insertion of the tool into the guide assembly causes the tool to directly engage the second biasing element thereby preventing the second biasing element from engaging the retaining notch.

11. The guide assembly a set forth in claim 10, wherein the support edge is integral with the base.

12. The guide assembly as set forth in claim 10, wherein the bar, the first biasing element and the second biasing element are a single spring.

13. The guide assembly as set forth in claim 12, wherein the base includes a cover notch configured to align with the notch provided on the button; whereby the alignment of the cover notch and the notch on the button allows the tool to be inserted.

14. The guide assembly as set forth in claim 12, wherein the insertion of the tool actuates a retaining arm, the retaining arm flexibly mounted to the button.

15. The guide assembly a set forth in claim 12, wherein the first arm includes a first channel and to second includes a second channel, the first and second channel being configured to hold the single spring in position with respect to the button.

16. The guide assembly set forth in claim 15, wherein the position of the second biased element can be maintained in the flexed position via the insertion of the tool into the notch on the button.

17. The guide assembly set forth in claim 16, wherein the position of the first biased element is influenced by a first flexing member and the position of the second biased element is influenced by a second flexing member, the first and second flexing members configured to be substantially flush with a sliding surface of the button when installed.

18. A system for a vehicle headrest comprising:
  a headrest mounted on a headrest support, the headrest support including a plurality of positioning notches and at least one retaining notch;
  a guide assembly for receiving the headrest support; the guide assembly comprising:
    a button having a first and second arm;
    a spring mounted on the first and second arm for selectively engaging the plurality of positioning notches on the headrest support, the spring configured to automatically engage the retaining notch on the headrest support; and
    a notch, the notch of the guide assembly forming at least a portion of a passageway in the guide assembly, the passageway configured in operation to allow insertion of a tool whereby the insertion of the tool to directly a engage the spring prevents the spring from engaging the retaining notch.

19. The system as set forth in claim 18, the guide assembly further comprising a base and a cover for encapsulating and slidably supporting the button.

20. The system as set forth in claim 19, the guide assembly further comprising a projection mounted on at least one of the arms and a lip mounted on one of the base and the cover, the projection and lip configured to engage each other to prevent the button from becoming separated from the base and the cover.

* * * * *